(12) United States Patent
Truher

(10) Patent No.: US 9,336,290 B1
(45) Date of Patent: *May 10, 2016

(54) ATTRIBUTE EXTRACTION

(71) Applicant: Google Inc., Mountain View, CA (US)

(72) Inventor: Joel Truher, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,071

(22) Filed: Jul. 2, 2015

Related U.S. Application Data

(63) Continuation of application No. 13/620,641, filed on Sep. 14, 2012, now Pat. No. 9,087,084, which is a continuation of application No. 12/011,197, filed on Jan. 23, 2008, now Pat. No. 8,285,697.

(60) Provisional application No. 60/886,296, filed on Jan. 23, 2007.

(51) Int. Cl.
*G06F 17/30* (2006.01)
*H04L 29/08* (2006.01)
*G06F 17/27* (2006.01)

(52) U.S. Cl.
CPC ...... *G06F 17/30563* (2013.01); *H04L 67/1085* (2013.01); *G06F 17/2705* (2013.01); *G06F 17/277* (2013.01); *G06F 17/2785* (2013.01); *G06F 17/30654* (2013.01)

(58) Field of Classification Search
CPC .............. G06F 17/2785; G06F 17/277; G06F 17/30654; G06F 17/2705
USPC .................................................. 707/706, 708
See application file for complete search history.

(56) References Cited

U.S. PATENT DOCUMENTS

| | | | |
|---|---|---|---|
| 5,677,835 A * | 10/1997 | Carbonell et al. | ................ 704/8 |
| 5,995,920 A * | 11/1999 | Carbonell et al. | ................ 704/9 |
| 6,295,391 B1 | 9/2001 | Rudd et al. | |
| 6,584,464 B1 * | 6/2003 | Warthen | ................ 707/E17.071 |
| 6,675,159 B1 * | 1/2004 | Lin et al. | ................ 707/E17.071 |
| 7,324,936 B2 * | 1/2008 | Saldanha et al. | ....... 707/E17.006 |
| 7,461,047 B2 * | 12/2008 | Masuichi et al. | ...... 707/E17.068 |
| 7,555,441 B2 | 6/2009 | Crow et al. | |
| 7,594,189 B1 | 9/2009 | Walker et al. | |
| 7,685,118 B2 | 3/2010 | Zhang | |
| 7,783,741 B2 | 8/2010 | Hardt | |
| 8,285,697 B1 | 10/2012 | Truher | |
| 2002/0023144 A1 | 2/2002 | Linyard et al. | |
| 2002/0029232 A1 | 3/2002 | Bobrow et al. | |
| 2003/0061025 A1 * | 3/2003 | Abir | ................................... 704/7 |
| 2004/0006737 A1 | 1/2004 | Colbath et al. | |
| 2004/0030687 A1 | 2/2004 | Hidaka et al. | |
| 2004/0264780 A1 | 12/2004 | Zhang et al. | |
| 2005/0022115 A1 | 1/2005 | Baumgartner et al. | |
| 2005/0108001 A1 * | 5/2005 | Aarskog | ........................ 704/10 |
| 2005/0114325 A1 | 5/2005 | Liu et al. | |

(Continued)

*Primary Examiner* — Albert Phillips, III
*Assistant Examiner* — Tiffany Thuy Bui
(74) *Attorney, Agent, or Firm* — Fish & Richardson P.C.

(57) ABSTRACT

A data object submitted for storage is analyzed, and a set of values is extracted from the data object that can correspond to a set of attributes. The analysis of the data object can also identify possible new ontology terms. One or more extracted values are presented to the entity which submitted the data object for approval and feedback. This feedback can be used to characterize the data object with appropriate terms, train the extraction process for future extractions, and/or expand the set of known ontology terms.

16 Claims, 7 Drawing Sheets

(56) References Cited

U.S. PATENT DOCUMENTS

| | | |
|---|---|---|
| 2005/0137723 A1 | 6/2005 | Liu et al. |
| 2006/0206472 A1 | 9/2006 | Masuichi et al. |
| 2007/0055656 A1* | 3/2007 | Tunstall-Pedoe ............... 707/3 |
| 2007/0067293 A1 | 3/2007 | Yu |
| 2007/0150800 A1 | 6/2007 | Betz et al. |
| 2008/0077548 A1* | 3/2008 | Michelin ...................... 704/9 |
| 2008/0086539 A1 | 4/2008 | Bloebaum et al. |
| 2008/0270380 A1* | 10/2008 | Ohrn et al. ................... 707/5 |
| 2009/0210631 A1 | 8/2009 | Bosworth et al. |

* cited by examiner title: "Mary had a little lamb"
title: "Mary had a little lamb a nursery rhyme:"
name: Mary
topic: education
topic: fleece
color: white
animal: lamb
size: small
recipe type: lamb
document type: recipe
weather condition: snow
document type: song lyrics
document type: poem

300

*Mary had a little lamb* *a nursery rhyme:*

*Mary had a little lamb,*

*little lamb, little lamb,*

*Mary had a little lamb, its fleece was white as snow.*

*And everywhere that Mary went,*

*Mary went, Mary went,*

*and everywhere that Mary went, the lamb was sure to go.*

*It followed her to school one day*

*school one day, school one day,*

*It followed her to school one day, which was against the rules.*

*It made the children laugh and play,*

*laugh and play, laugh and play,*

*it made the children laugh and play to see a lamb at school.*

*And so the teacher turned it out,*

*turned it out, turned it out,*

*And so the teacher turned it out, but still it lingered near,*

*And waited patiently about,*

*patiently about, patiently about,*

*And waited patiently about till Mary did appear.*

*"Why does the lamb love Mary so?"*

*Love Mary so? Love Mary so?*

*"Why does the lamb love Mary so," the eager children cry.*

*"Why, Mary loves the lamb, you know."*

*The lamb, you know, the lamb, you know,*

*"Why, Mary loves the lamb, you know," the teacher did reply*

Thank you for your submission. Your upload is saved and can be found at the following address on the Internet:
http://www.example.com To help others find you submission please help by answering the following questions:

It appears that you have uploaded a text document

Is the title of your document:
    "Mary had a little lamb" [X]
    "Mary had a little lamb a nursery rhyme:" [ ]
Other: [　　　　　] [ ]

Is your document about someone named Mary? [X] Yes [ ] No

Is the topic of you document:
    education [ ]
    fleece [ ]
Other: [ nursery rhyme ] [X]

Is your document about something white in color? [X] Yes [ ] No

Is your document about a lamb (animal)? [X] Yes [ ] No

Is your document about something small? [X] Yes [ ] No

Is your document a recipe? [ ] Yes [X] No

Is the recipe a lamb dish? [ ] Yes [X] No

Does your document involve the weather condition snow? [ ] Yes [X] No

Is your document lyrics for a song? [ ] Yes [X] No

Is your document a poem? [X] Yes [ ] No

SUBMIT

FIG. 5

ATTRIBUTE EXTRACTION

RELATED APPLICATIONS

This application is a continuation application of, and claims priority to, U.S. patent application Ser. No. 13/620,641, filed on Sep. 14, 2012, entitled "Feedback Enhanced Attribute Extraction," now U.S. Pat. No. 9,087,084, which claims the benefit of priority from U.S. patent application Ser. No. 12/011,197, filed on Jan. 23, 2008, entitled "Feedback Enhanced Attribute Extraction," now U.S. Pat. No. 8,285,697, which claims the benefit of priority from U.S. Provisional Patent Application No. 60/886,296, filed on Jan. 23, 2007, entitled "Feedback Enhanced Attribute Extraction." The disclosure of the foregoing applications are incorporated herein by reference in their entirety.

BACKGROUND

The present disclosure relates to digital data categorization and searching.

Computer databases now serve as storehouses for diverse types of information and media including documents, images, audio files, videos, and practically any other type of information capable of being stored in a digital format. The interconnected nature of today's computing environment offers the capability for users to have nearly instant access to this information regardless of their physical location. Searching interfaces serve as gateways to the vast information stored in these databases, but due to the tremendous amount and diverse types of digital data that are now accessible, searching for a broad category of data or performing mere keyword searches of these data stores can return an unmanageable number of results. The particular data being sought by the searcher can be obscured by a cumbersomely large result set, limiting the usefulness and efficiency of the search.

To assist the searcher in retrieving the sought after data, a search interface can offer refinement options to narrow the list of results. In order to maximize the usefulness of such refinement options, the options presented can be based on the result set of a search and/or the search query itself. Creating useful a list of options for presentation to a user in narrowing a result set can be accomplished manually, but the process can be tedious, especially for large and diverse data sets.

SUMMARY

This document describes systems and techniques that may enhance the manner in which data objects are stored and are presented to users searching for such data objects. For example, the systems and techniques described here may involve asking a user who uploads a data object to a system for information about the data object. Questions posed to the user may be based on an initial analysis of the uploaded object. For example, an uploaded text document can be analyzed and its contents compared to terms stored in an ontology in order to initially classify the document. The results of the analysis can also be used, for example, to create a list of questions that can be used to solicit feedback from the user who uploaded the data object in order to confirm (or repudiate) the validity of one or more classifications. Classifications confirmed by the user as valid can be stored in association with the uploaded data object. The associated classifications can be used later, for example, by search engine users to locate the document. The feedback can be used, for example, to train the analysis process for future use and/or to update the ontology.

In general, one aspect of the subject matter described in this specification can be embodied in methods that include the actions of receiving a data object uploaded from a user interface device, analyzing the uploaded data object based on an ontology to extract a plurality of values having corresponding attributes, presenting a feedback request to the user interface device, the feedback request including at least one question as to whether an extracted value paired with its corresponding attribute accurately characterizes the data object, receive a response to the feedback request from the user interface device, and store a confirmed attribute-value pair in association with the uploaded data object.

Further optional features include the following features. A system implementing the method can train an extraction process based on a confirmed attribute-value pair. A new term can be added to the ontology based on a confirmed attribute-value pair. An uploaded data object can be served to a remote computer over a network, and the data object can be served in response to a request for data objects characterized by a confirmed attribute-value pair. Uploaded data objects can include text, audio, image, and video files. Analysis of audio files can include speech-to-text conversion. Analysis of image files can include an image recognition process. Analysis of video files can include speech-to-text conversion and an image recognition process. A candidate ontology term extracted from a data object that is not found in the ontology can be added to the ontology if a feedback response indicates that the term is contextually relevant to the data object.

Other embodiments of this aspect include corresponding systems, apparatus, and computer program products.

BRIEF DESCRIPTION OF THE DRAWINGS

FIG. 3 is an example text document data object.

FIG. 5 shows an example feedback form.

Like reference numbers and designations in the various drawings indicate like elements.

DETAILED DESCRIPTION

Figure 1A:
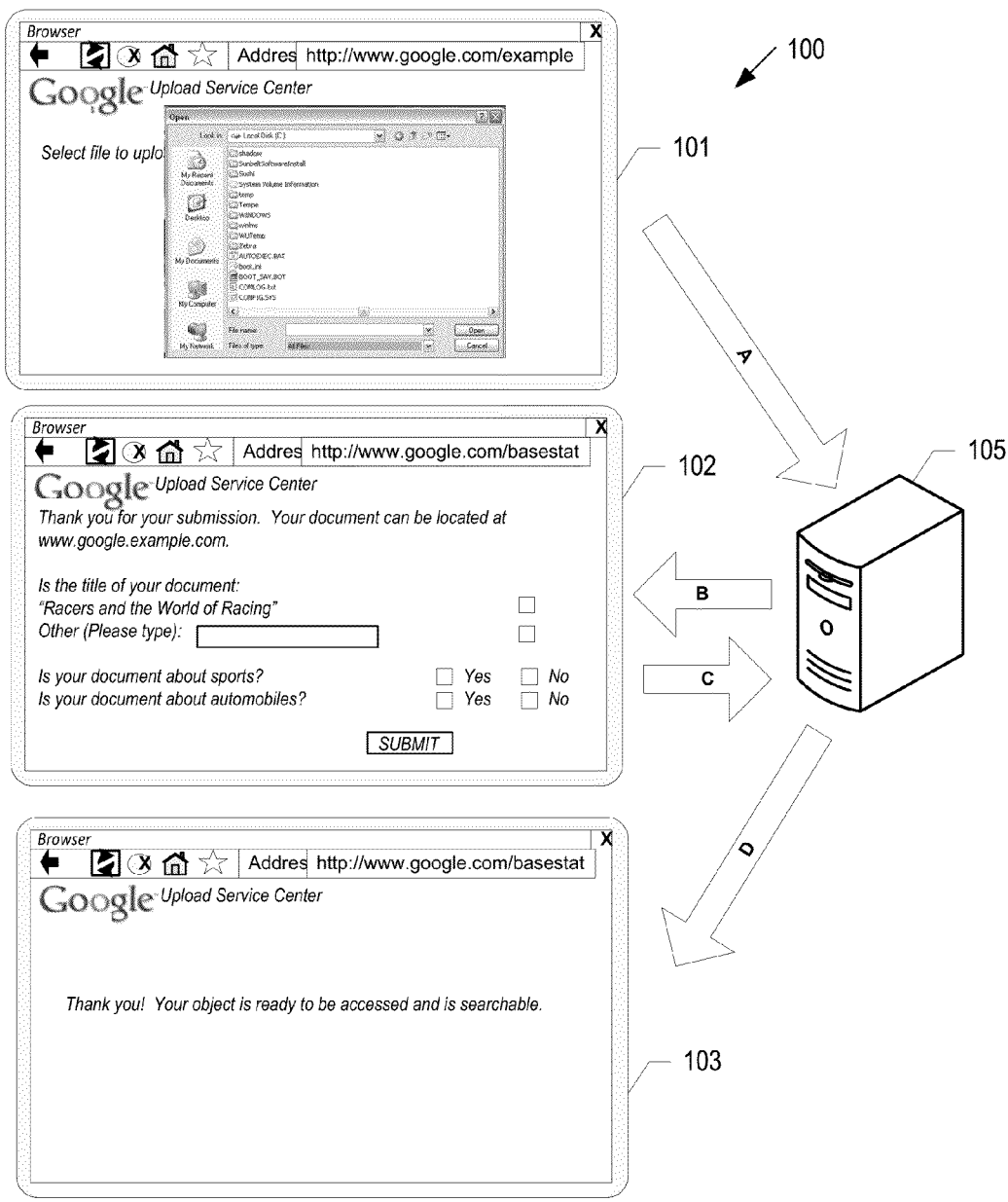
FIG. 1A is a conceptual diagram showing a process by which a user may provide content to a central server system.

FIG. 1A is a conceptual diagram showing a process 100 by which a user may provide content to a central server system 105. In general, the process involves receiving an object, such as an electronic file of information (e.g., a database file, word processing document, web page, etc.) at the server system 105, analyzing the receive object (or objects) and generating one or more contextual clarifying questions based on the content of the object, and then presenting the questions back to a user who submitted the object. The answers to such questions may be used to better classify the object so that it can be located more readily by the user or by other users seeking such an object.

The process 100 is generally exemplified here by displays 101-103 and lettered arrows between those displays 101-103 and server system 105. In this example, the displays 101-103 are examples of screen shots that may be presented to a user who has logged onto the serer system 105 using a web browser. The user may interact with the server system 105 in conventional manners to provide objects and additional information to the server system 105. Although a single server is shown to represent the server system 105 for purposes of clarity, it will be understood that the server system 105 may include a number of servers performing a variety of function.

Display 101 shows that the user has already logged onto the server system 105, and is particularly using an application that permits the user to upload objects to the server system 105. The particular application may be associated with a more general application or applications such as the GOOGLE BASE system. In this example, the user has already indicated a desire to upload an object, and display 101 shows a pop up navigation window by which the user identifies the file to upload.

Arrow A shows the passing of the file from the user's computer, which is generally located remote from the server system 105, to the server system 105. Upon receiving the file, the server system 105 may analyze the file using techniques described more fully below. The analysis may permit the server system 105 to obtain a preliminary understanding of the file. For example, the analysis may permit the server system 105 to identify a title of the file, various topics addressed in the file, the purpose of the file (e.g., is it a database of product process, a spreadsheet showing a person's schedule, a manuscript for a book, etc.), and other such information.

In normal operation, the user could simply be asked to provide such information when he or she uploads the file. However, such a request from the user may be burdensome, so that the user does not comply, and simply uploads the file without responding to the request for additional meta data about the file. Alternatively, the user might simply enter one or two topics—either because the user does not want to be bothered and wants to enter the minimum amount needed to make the upload work, or because the user does not remember all of the various topics associated with the object.

As shown here by Arrow B and display 102, the server system 105, through its analysis has identified preliminary information that it provides back to the user for confirmation. In this example, the server system 105 has identified a potential title of the document in a file uploaded by the user, along with two potential topics for the document. The display 102 provides a simple mechanism by which the user can confirm whether the preliminary classifications made by the server system 105 are correct. Thus, for example, the user can confirm the title inferred by the server system 105 by checking a first box, or may provide a different title and check a second box. Likewise, the user can confirm or refute the two suggested topics for the document that were inferred by the server system 105.

Arrow C shows the transmission of the user's selections (e.g., in an HTTP request) to the sever system 105. Upon receiving such information, the server system 105 may store it as meta data associated with the uploaded object and may also index such meta data so that it can be used in generating results for future search queries received by the server system 105. Arrow D and display 103 then show a confirmation sent to the user by the server system 105 indicating that the object has been uploaded and classified adequately.

Figure 1B:
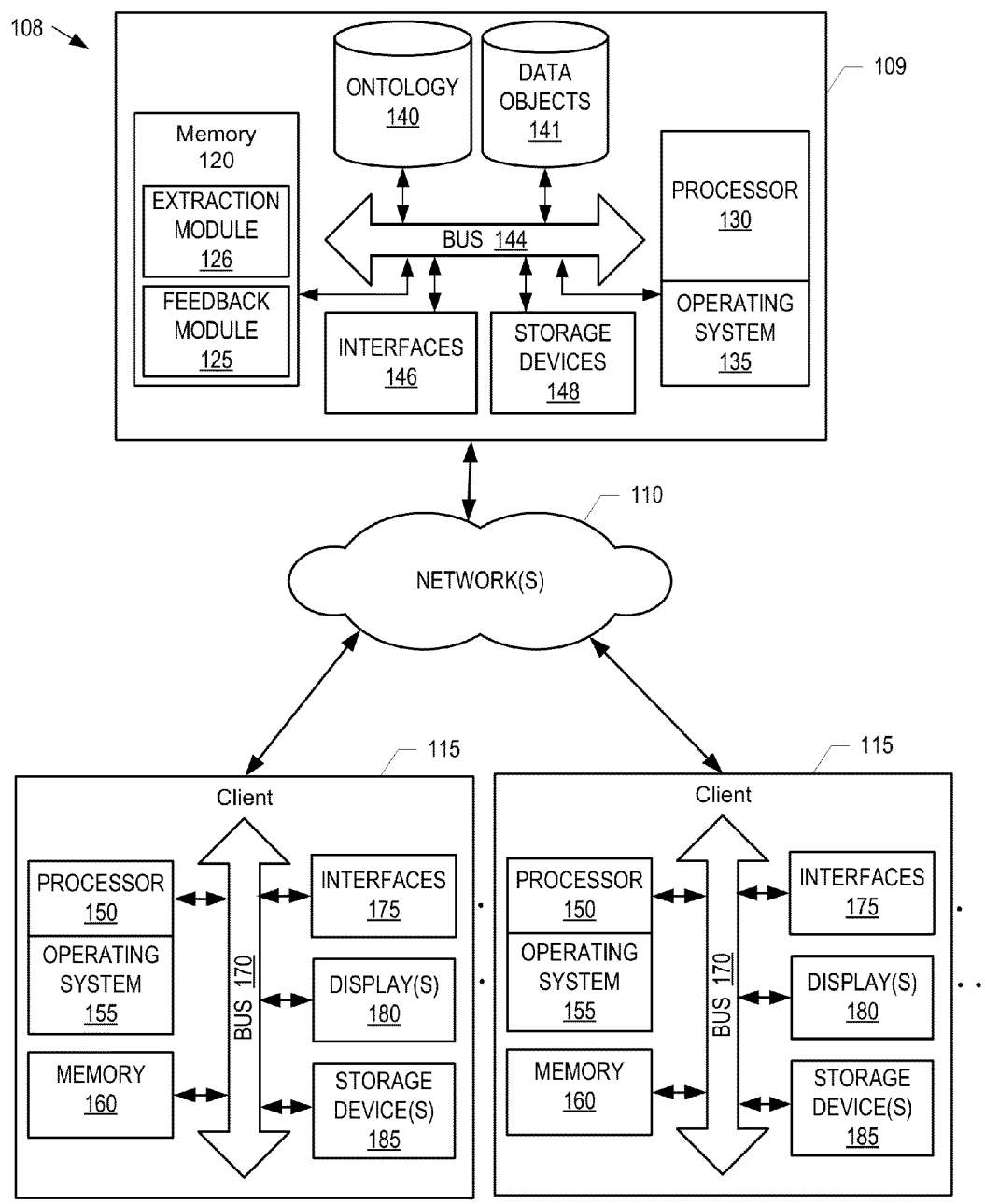
FIG. 1B is a block diagram of an example attribute extraction system.

FIG. 1B is a block diagram of an example attribute extraction system 108. The system 108 includes at least one server 109 in communication with one or more clients 115 via at least one network 110. The clients 115 can each include a device, such as a personal computer, a wireless telephone, a personal digital assistant (PDA), a laptop computer, or another type of computation or communication device, a thread or process running on one of these devices, and/or an object executable by one of these devices. The server 109 can include one or more servers that gather, store, process, maintain, and/or manage web page impressions, and process complex queries. The server 109 can also include one or more servers that accept uploaded data from a client 115 for storage.

Although two clients 115 and a single server 109 are shown in FIG. 1, there can be more servers and more or fewer clients. For instance, some of the functions performed by the server 109 can be performed by one or more other servers such that the server 109 can represent several devices, such as a network of computer processors and/or servers. The network(s) 110 can include one or more local area networks (LANs), wide area networks (WANs), telephone networks, such as the Public Switched Telephone Network (PSTN), intranets, the Internet, and/or or other type of network. The client(s) 115 and server 109 can connect to the network(s) 110 via wired, wireless, or optical or other connections. In some implementations, one or more of the devices illustrated in FIG. 1 are directly connected to another one of the devices. For example, in some implementations, the clients 115 are directly connected to the server 109.

The server 109 generally includes a processor 130, an operating system 135, a memory 120 including a feedback module 125 and an attribute extraction module 126, an ontology database 140, a data objects database 141, one or more interface(s) 146, one or more storage device(s) 148, and a bus 144. The bus 144 can include one or more paths that permit communication among the components of server 109.

The processor 130 includes any appropriate type of conventional processor, microprocessor or processing logic that interprets and executes instructions, and works in conjunction with the operating system 135 to execute instructions stored in the memory 120 and/or storage devices 148 of the server 109. The memory 120 can include a random access memory (RAM) or another type of dynamic storage device that stores information and instructions for execution by the processor 130. The storage device(s) 148 can include a conventional ROM device or another type of static storage device that stores static information and instructions for use by the processor 130. Additionally, the storage device(s) 148 can include a magnetic and/or optical recording medium and its corresponding drive. According to an implementation, although the operating system 135 is shown as separate from the memory 120 and storage device(s) 148, the operating system 135 may be stored within the memory 120 and/or storage device(s) 148.

The server 109 includes one or more interfaces 146 that permit input to the server 109 via one or more conventional mechanisms, such as a keyboard, a mouse, a pen, voice recognition and/or biometric mechanisms, etc. The interface(s) 146 can also permit output from the server 109 via one or more conventional mechanisms, such as a display, a printer, a speaker, etc. The interface(s) 146 can further include one or more communication interfaces that enable the server 109 to communicate with other devices and/or systems. For example, the interface(s) 146 can include mechanisms for permitting the server 109 to communicate with the clients 115 via one or more networks, such as the network(s) 110. The interface(s) 146 can permit the server 109 to communicate with other servers, including Internet servers.

In operation, the server 109 can store data objects in the data objects database 141. In some implementations, the server is operable to receive data objects from clients 115 for storage in the database 141. The server is further operable to analyze the data object stored in the data object database 141 to extract attributes for the data object and to solicit feedback from one or more users regarding the results of the extraction process. In some implementations, the server 109 performs these operations in response to the processor 130 executing software instructions contained in a computer-readable medium, such as the memory 120. In some implementations, the software instructions for extracting attributes from the data object are included in an attribute extraction module 126 within the memory 120. The attribute extraction module 126 can analyze the data object stored in the data object database to extract related attributes from the data. In some implementations, the software instructions for soliciting feedback regarding the results of the extraction process are included in a feedback module 125 within the memory 120. The feedback module 125 can present inquiries to users of clients 115 to determine if the results of the extraction process accurately represent the content of the analyzed data object. The feedback module 125 can be further configured to accept responses to adjust the results of the extraction process according to the responses, if needed, and to train the extraction process for use in later extractions.

The extracted attributes, following any needed adjustments according to the accepted responses, can be stored along with the data object in the data object database 141. Alternatively, or in addition, the adjusted attributes can be stored in a separate data structure (not shown) which includes a reference matching the adjusted attributes to their corresponding data object. The data objects and the adjusted attributes are preferably stored in a data structure that permits complex queries to be answered quickly, and which optimizes the space required for storing such data.

The software instructions can be read into the memory 120 from another computer readable medium, such as the storage device(s) 148, or from another device via the interface(s) 146. The software instructions contained in the memory 120 cause processor 130 to perform processes described in this disclosure. Alternatively, hardwired circuitry can be used in place of or in combination with software instructions to implement processes consistent with the disclosure. Thus, implementations are not limited to any specific combination of hardware circuitry and software.

The client device(s) 115 include a processor 150, an operating system 155, a memory 160, one or more interface(s) 146, one or more display(s) 180 one or more storage device(s) 185, and a bus 170. The bus 170 includes one or more paths, such as data and address bus lines, to facilitate communication between the processor 150, the operating system 155, and the other components within the client 115. The processor 150 executes the operating system 155, and together the processor 150 and operating system 155 are operable to execute functions implemented by the client 115, including software instructions contained in a computer-readable medium stored in the memory 160.

The memory 160 can include random access memory, read-only memory, a hard disk drive, a floppy disk drive, a DVD, CD-ROM, or other drive type, for storing information on various computer-readable media, such as a hard disk, a removable magnetic disk, or a DVD or CD-ROM disk. Additionally, the interface(s) can control input/output devices of the client 115, such as a video display, a keyboard, a scanner, a mouse or joystick or other input or output devices. The interface(s) can also include one or more input/output ports and/or one or more network interfaces that permit the client 115 to receive and transmit information, such as from and to the server 109, such as via the network(s) 110.

The server 109 and clients 115 illustrated in FIG. 1 support combinations of means for performing the specified functions described herein. As noted above, it will also be understood that each block of the block diagrams, and combinations of blocks in the block diagrams, can be implemented by special purpose hardware-based computer systems that perform the specified functions or steps, or combinations of special purpose hardware and computer instructions. Further, the server 109 and clients 115 can each be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices. Accordingly, the server 109 and/or clients 115 may take the form of entirely hardware, an entirely software or a combination of software and hardware, such as firmware. Furthermore, though illustrated individually in FIG. 1, each component of the server 109 and clients 115, respectively, may be combined with other components within the server 109 and/or clients 115 to effect the functions described herein.

The server 109 includes an ontology 140 for use in analyzing the data objects and extracting attributes therefrom. An "ontology" as used herein is a data model representing terms that are relevant to an area of interest or domain. Ontologies can describe specific objects, classes of objects, attributes of objects, and relationships between objects. Classes are sets, collections, or types of objects. Attributes are properties, features, and characteristics of objects. Relationships are ways in which objects can be related to one another.

Using the example of a word processing document, for example, a term paper on Hawaii, the specific object is the file itself. An example of a class into which this object can fall are "term papers" which would include all term papers within the domain, and "word processing documents". Examples of attributes are the "title of the document", the "topic", the "type of file", and the "length of the file". Classes can be described using attributes depending on the choice of attribute. The class of "term papers", for example, can be described using a "type of document" attribute, and the class of "word processing documents" can be also be described using the same attribute. A class refers to all objects in the domain that belong to the class, and an attribute describes a characteristic of an individual object. Attributes have values associated with them. These values vary depending on the specific attribute considered. For example, the attribute "color" can have values of "red", "blue", "yellow", "green", etc. In some cases attributes are more complex. For example, the attribute "topic" for a given object such as an Internet blog site about a trip to Spain can have multiple values such as "travel", "Europe", and "Spain". An attribute along with a value are sometimes referred to as an attribute-value pair.

A term included in the ontology is referred to herein as an ontology term. An ontology term can include any term used in the data model, including classes, attributes, all corresponding values for each attribute, and relationships. Ontology terms are stored in the ontology database 140.

In the description that follows, an implementation involving the extraction of attributes and/or attribute values is described, but the described methods and system can be used similarly with respect to class and relationship determinations. Data objects as described herein include text files such as those comprising ASCII text, binary files such as audio data, image data, video data, and the like, and any combination of the aforementioned data types.

Figure 1C:
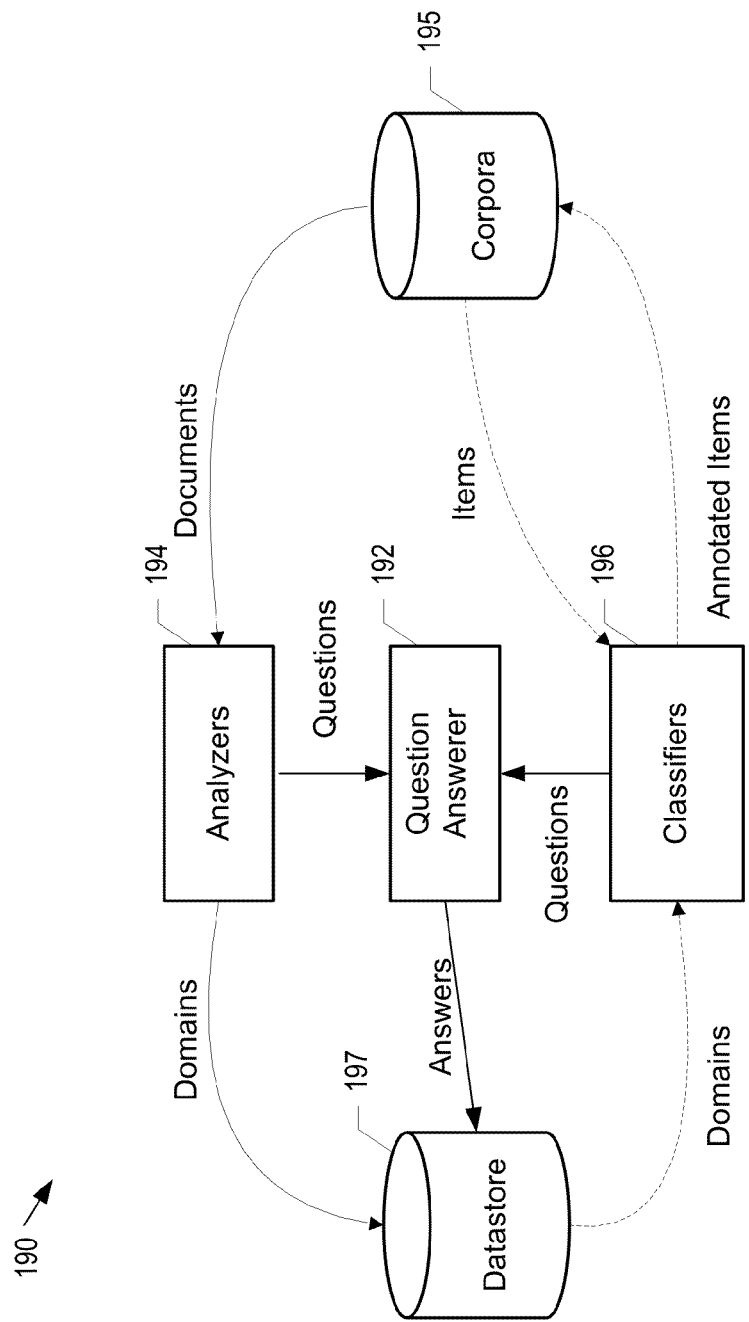
FIG. 1C is a schematic diagram of a system for annotating objects such as documents and other electronic files.

FIG. 1C is a schematic diagram of a system 190 for annotating objects such as documents and other electronic files. In general, the system 190 operates on various forms of data objects, for example, features and documents from different corpora 195, to assign various meta data to the objects in the form of various attribute value pairs. Through such a technique, the meta data can be added to objects to make the objects easier to identify during information retrieval, for example, such as when users search the corpora for objects of interest by providing query terms. The various corpora may take a wide variety of forms, such as general internet web pages, local web pages (e.g., pages addressed by a local search system), databases such as GOOGLE BASE, product search data submitted by product vendors or otherwise obtained, and other unstructured, semi-structured, or structured databases of information.

Two flows of information are shown in the example. The first flow, shown by solid lines, generally involves an analysis process that can occur off-line and can be performed intermittently or periodically, for example, when the corpora 195 is subject to low traffic. The process involves taking objects from the corpora and applying one or more analyzers to the objects to compute a domain or domain model for the objects, and then storing the domain models that are so derived in the datastore 197. The other flow, shown by dashed lines, generally involves classification of objects or items in the corpora so as to provide annotations to the items. Such a process generally happens in real time or near real time, for example, in response to a new item being added to the corpora. Each of the processes includes unsupervised and supervised components. The supervised components involve the use of a question answerer 192 to confirm or refute suggested values for various attributes for an object, as shown in examples above and below. For example, a user who uploads an item (or another user or users) can be presented with information inferred by the system 190, and the user can provide feedback about whether the information is accurate or not. Such information fed back by the users can then be incorporated into the annotations that are stored with or related with the items in the corpora 195.

Referring now in more detail to the process represented by the solid lines, in this example, documents are first accessed from the corpora. The documents can be, for example, web pages that have been crawled for use in a search engine and may be formatted in a variety of manners, such as in an HTML format. The extracted documents can then be provided to one or more analyzers, which act to compute a domain model for each document or set of documents. To do so, the extractors extract various signals from the documents and combine such extracted signals into a class specification or domain. A domain may be considered to be similar to an object oriented programming class, in that it can have a type and various attributes. The domains may also be organized hierarchically. For example, a "trumpet" may be considered a child of a "brass instrument," which may in turn be a child of "musical instrument." The trumpet may have an attribute such as the number of valves, and the attribute may have values such as three (most trumpets) or four (perhaps some trumpets).

Various forms of analyzers can also be used to conduct such analysis. For example, one analyzer can be established to analyze particular, well-understood web sites that are generally small in number, so as to produce accurate information that has a very good correlation to particular attributes, but has potentially incomplete information. Such an analyzer may operate according to generally known techniques, such as by having a human operator establish parameters for a pattern recognizer, either manually or semi-automatically, and then parsing the objects using the pattern recognizer. Using the example above, for instance, various web sites relating to music may be patterned, and the analyzer may identify values for various parameters, such as identifying a trumpet that is identified as having three valves. The connection between the trumpet and the three valves, or between the attribute "valves" and the value of "three", can be relatively strong in such a situation. However, because the analysis of the site involves some manual operation, the amount of information that can be analyzed in this manner may be limited as a practical matter. Thus, in this example, the analyzer only finds the value of "three" for valves, and does not "know" that there are four-valve trumpets.

Another type of analyzer can be implemented to be less precise with respect to matching attributes to values, but much more complete in its coverage. For example, such an analyzer may analyze a broad array of web sites or other forms of documents, and may look for repeated structures in the pages, e.g., by analyzing DOM tree organizations of web pages. In one example, the analyzer may use parallel HTML structures such as list, table, and form structures, to find common sets in the various pages. The sets may then be expanded using overlapping co-occurrence between the pages, and may also be expanded using ontology enumerations. Such an approach may provide a weaker connection between a particular attribute and particular values for the attribute, but it may provide more complete value coverage because of its broader reach across a greater array of sites. Using the trumpet example again, such an analyzer may see many documents that speak of trumpets, valves, and the number three in similar ways, and may also see a smaller number of documents (but still a significant number) that speak of trumpets, valves, and the number four (or the numbers three and four). Thus, although the analyzer may not be able to draw as confident a link between the numbers and the terms "trumpet" or "valve", it does have a more complete set of values.

The operation of the various forms of analyzers may also be combined, as appropriate, to improve the analysis function. In particular, there may be overlap between the signals extracted using one extractor and those using another. Where the overlap is sufficient, the attributes and/or values from one extractor may be used to improve the results achieved by the other extractor. Referring again to the trumpet example, the two analyzers may overlap in their use of the terms trumpet, valve, and numbers together. As a result, the more specific analyzer may use the information from the more general analyzer that ties the attribute values of "three" and "four" together, and may thus extend its knowledge to include an understanding that trumpets can have three valves and four valves.

When an appropriate domain model is determined for a document or group of documents, the domain model may be provided for storage in datastore 197. The analyzers may also attach a provenenance to created domains before providing them to the datastore 197. The provenance is a pointer of an appropriate form back to the originating object in the corpora 195. In such a manner, if information needs to be removed from the datastore 197 or otherwise tracked back from the datastore 197 to its originating object or objects in the corpora 195, such tracking may occur without having to affect large swaths of data in the datastore 197.

Supervision may be applied to the analysis using the question answerer 192. In particular, where the analyzer cannot make definitive determinations about an attribute, it may present the attribute to a human operator who may confirm or refute the information. Using the trumpet example again, the correlation between the results of the two analyzers may not be complete or certain enough so that the system 190 can determine with sufficient confidence that trumpets can have three or four valves (and no other values). In such a situation, the analyzer may pose a question to a human user, such as by asking the user the number of valves that a trumpet can have, and presenting the numbers three and four next to check boxes (along with a control that lets the user add additional values). Such feedback from the user may then be provided to the analyzers 194 or the datastore 197 to update the range of the attribute values by the new value that was learned, or to confirm the already-stored values (e.g., by adding a higher confidence level to the information). Such feedback may also be held back until multiple people have provided the same or similar answers. For example, one user may not have ever seen a four-valve trumpet, while three others have. By waiting for answers from multiple users, the information that updates the datastore 197 may be more complete and accurate.

The particular questions that are posed to a user may be chosen in a variety of manners, such as using heuristic rules. For example, particular questions or kinds of questions may be triggered when a particular signal is identified in an item. For example, items identified as probable titles of documents may trigger a certain question via one heuristic, while potential topics in the document may trigger others. Various other appropriate techniques may also be used for generating questions or a series of questions. In general, the question may be selected to minimize the level of effort required by the user to respond to the questions.

The other side of the system 190 centers around one or more classifiers 196. The classifiers may take various well-known forms, including a Naive Bayes classifier or other such trainable classifiers. The classifiers 196 may draw objects or items from the corpora 195 and may annotate the items using information from domains that are obtained from the datastore 197. The classifiers 196 may be trained using supervision from the question answerer 192. For example, web pages may be obtained from the corpora 195, and human users may assign annotations to them. As one example, such users may identify topics that are addressed in the pages. Those answers provided by users may then be provided as information to the datastore 197 in much the same manner that answers to questions posed in the analyzer process would be provided. Such answers may also be used to annotate the object or item, where the annotations are provided back to the corpora for storage in association with the underlying item or object.

The classifier, when properly trained, can also operate in an unsupervised manner. For example, the classifier may obtain one or more documents from the corpora 195 and may match such documents to domains obtained from the datastore 197 to identify attributes and associated values for such documents. As one example, described above and below, the classifiers 196 may obtain a document when a user attempts to upload it to a system. The classifiers 196 may then match the document in various known manners to the domains from the datastore 197 to identify attributes for the document. In addition, the classifiers may attempt to determine whether an appropriate value is present in the document for the particular attribute. For example, if an attribute of "car" is identified, and a color of "red" is also in the document, the classifier may check against the domains to determine that red is an acceptable value for a car and to conclude that the term red in the document is meant to refer to the term car, i.e., that red is a value of the car attribute.

The classifiers 196 may also determine, in various known manners, a level of confidence in assigning a particular attribute and value for the obtained document. If the confidence value is sufficiently high, the attribute and value may simply be applied as annotations for the item or document. If there is a middle level of confidence, the proposed annotations may be presented to the question answerer 192 in manners like those described above and below, to obtain confirmation of whether the attribute and value is accurate for the item or document. If the confidence value is sufficiently low, the information may simply be passed by, under the assumption that it cannot be confirmed automatically, and that an attempt to present the proposed answer to the question answerer may lead the person providing the answers to question the quality of the system 190. For example, a user may be less likely to use a system in the future if the system asks the user if the color of a car is "oil" or "vinyl."

Figures 2, 4:
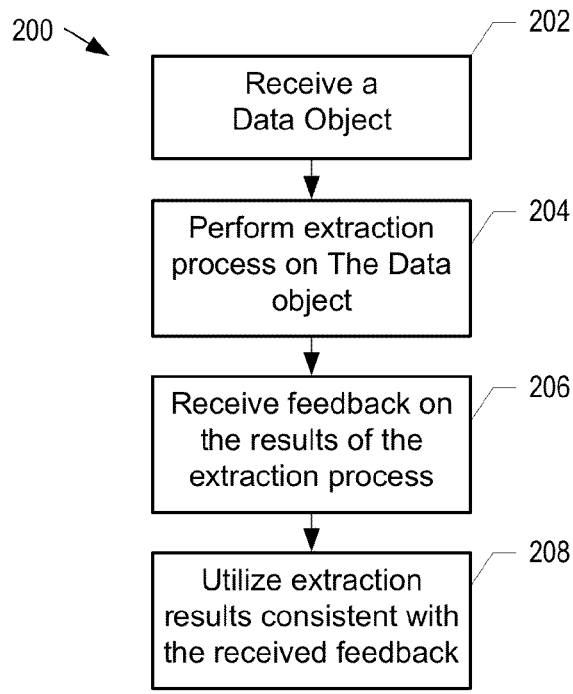
FIG. 2 is a flowchart of an example method for performing attribute extraction.
FIG. 4 shows example extraction results for a text document data object.

FIG. 2 is a flowchart of an example method 200 for performing attribute extraction. The process begins with the receipt of a data object (202). This can occur, for instance, by the server 109 receiving data uploaded from a client 115. The uploaded data can include, for example, information to be made available on the Internet such that a web browser directed to a web server can access the data after it has been uploaded from the client 115. The uploading can be accomplished via any known file transfer means. In some implementations, the uploaded data object is accepted by the server 109 from the client 115 via a web uploading interface. That is, the server 109 can provide a webpage to a web browser on a client 115. The client 115 can display the webpage on a display through its web browser, with the client 115 operating as user interface device. The web page can allow a user of the client 115 to select a file local to the client 115, such as a file in the memory 160 or on a storage device 185 for transfer to the server 115.

Upon receiving the uploaded data object, the server 115 can store the data object in the data object database 141. The database 141 need not be local to the server 115. That is, the data object can be stored in some other server connected to the network(s) 110. An extraction process is performed on the data object (204). The extraction process can be performed by the extraction module 126. The extraction process can vary depending on the type of data object being analyzed. For example, a file comprising ASCII text can be scanned for extraction targets, where the extraction targets comprise terms found in the ontology database 140, synonyms of those terms, antonyms of those terms, or words have other relationships to terms found in the ontology database 140. An audio file can be passed through a speech-to-text program and the resulting text can be scanned for extraction targets. An image file or video file can be passed through one or more image recognition programs and the resulting output can be scanned for extraction targets.

The results of the extraction process can comprise a list of known ontology terms and candidate ontology terms. Known ontology terms are terms which were found in the both the data object and the ontology database 140, and/or terms from the ontology database 140 known to be related in some manner (by either a relationship stored in the ontology database or a rule used by the extraction module 126) to terms found in the data object (or in the resulting output from intermediate operations as described above with respect to non-text files). Candidate ontology terms are terms found in the data object or terms known to be related in some matter to terms found in the data object that the extraction module identifies as potentially contextually relevant to the data object. That is, candidate ontology terms are terms which the extraction process identifies as possibly valuable in characterizing the data object.

Following the extraction process, the method can receive feedback on the results of the extraction process (206). Receiving feedback, in some implementations, can include soliciting feedback by sending a feedback form web page to a web browser of the client 115 that uploaded the data object. The feedback form web page can be generated by the feedback module 125. The feedback form web page can include the extracted ontology terms comprising the known ontology terms and/or the candidate ontology terms as they were identified by the extraction process. The form can request information from a user as to whether the extracted known ontology terms accurately characterize the data object, and/or whether the candidate ontology terms are contextually relevant to the data object. The feedback form can, for example, solicit feedback using web check boxes, radio buttons, text input fields, and other forms of web page input. A submit button or other indication that the form has been completed can be used to transfer the feedback to the server 109.

In some implementations, the information is gathered from the client user that uploaded the data object. This user can have knowledge of the uploaded data object beyond that which the extraction process is able to determine. In some implementations the candidate ontology terms are attributes and/or attribute values that the extraction process has identified as possibly valuable. The candidate ontology terms can be identified, for example, by their proximity to known ontology terms in the data object (for example, the term's location in a text document, their location in the document with respect to known ontology terms, spatial and relationships in an image and/or video, chronological relationships in audio and/or video, and similar volume level in audio and/or video). The candidate ontology terms can be identified in text data using known language characteristics for the language used in the data. For example, if the extraction module encounters a verb followed by a word that it does not recognize which is followed by a noun that is known in the ontology database as an attribute, the extraction module can identify the middle word as a candidate ontology term as a value for the attribute noun.

Some implementations utilize the extraction results consistent with the feedback given (block 308). Using the feedback, the system can insure that the extraction process is accurate as well as train the extraction process by learning from extractions resulting in both confirmations and rejections. Candidate ontology terms that are confirmed as being contextually relevant to the data object can be added to the ontology database, and the extraction process can also be trained based on this feedback.

FIG. 3 is an example text document data object 300. The example text document data object 300 can be uploaded to the server 109 from a client 115. The text comprises the nursery rhyme "Mary Had a Little Lamb". The extraction module 125 can analyze the text document to perform the extraction process.

FIG. 4 shows example extraction results 400 for a text document data object. The example extraction results 400 correspond to processing of "Mary Had a Little Lamb". The extraction results include two lines listing the attribute "title" with the respective values "Mary had a little lamb" and "Mary had a little lamb a nursery rhyme". The attribute "title" can be known in the ontology. The extraction module can, for example, determine that because this text appears on the first line of the document that it is potentially a title. Two title results can be due to "Mary had a little lamb" being bolded in the first line of the document and/or appearing repeatedly in the body of the document.

The term "Mary" can be known in the ontology as a value for the attribute "name" due to it being part of a base ontology (an initial ontology before training) or due to an earlier extraction and feedback process. Two "topic" attributes are listed including "education" and "fleece". The term "education" can be known in the ontology as a value for the attribute "topic", again due to it being part of a base ontology or a due to an earlier extraction process. The attribute value pair "topic: education" can be returned as part of the results set due to the words "school", "teacher" being related to "education" in the ontology. The term "fleece" may not be known in the ontology. It can appear in the list because the extraction module recognizes it is a noun due to it being followed in the document by the words "is white".

The term "lamb" can be known in the ontology as a type of "animal" as well as a type of recipe due to earlier recipe submissions used to train the extraction process. This can result in the extraction module outputting the potential "document type" of "recipe". The color "white" can be recognized as well as the adjective "little" related in the ontology to the term "small". The word "snow" can be known in the ontology as a "weather condition". Finally, due to the formatting of the document, the reoccurrence of words, and/or the detection of a rhyming scheme, the extraction module can return "document type" attributes of "song lyrics" and "poem". The extraction results can be sent from the extraction module 126 to the feedback module 125 for creating and presenting a feedback form to the client 115.

FIG. 5 shows an example feedback form 500. The example feedback form 500 can be generated by the feedback module using the extraction results of FIG. 4. The example form includes example answers as completed by a hypothetical user of the client 115. The form can indicate the URL of the uploaded data object. The form can also request feedback based on the extraction results. The form has been completed to indicate that the title is "Mary had a little lamb", and that it is about someone named "Mary". The topic of the document is indicated as a nursery rhyme as "education" and "fleece" were either erroneous or suboptimal topics for the document. The form has instead been completed using a type in field to indicate that the topic is a "nursery rhyme". "Fleece" was not known in the ontology, and here the form indicates that in this case the term "fleece" is not contextually relevant to the analyzed data object. The form indicates that the document is about something white, a lamb, and something small.

The completed form indicates that the document is not a recipe and that it is not a recipe for a lamb dish. The feedback module can make one or more form fields dependent on one another. For example, upon the answer to the question "Is your document a recipe?" the following question "Is the recipe a lamb dish?" can be completed automatically and/or grayed out such that it can no longer be answered. This behavior can be created using, for example, Javascript in the web page created by the feedback module 125. The remaining questions are also completed as the data object submitter sees as appropriate. Selection of the "SUBMIT" button can cause the completed feedback form to be sent to the server 115. While "yes" or "no" questions are primarily depicted, the feedback questions can be more complex. Modes of form input can also include radio buttons, select boxes, and the like.

In some implementations, answers to feedback questions can result in additional questions. The feedback is received by the server 115 and then utilized at least in part to characterize the data object, train the extraction process, and/or update the ontology, if appropriate. Attribute-value pairs confirmed as relevant through the feedback process can be stored in association with the data object to assist search engine users in retrieving the data object at a later time. The data object can be served to a remote computer through, for example, a web server interface of the system 109.

Figure 6:
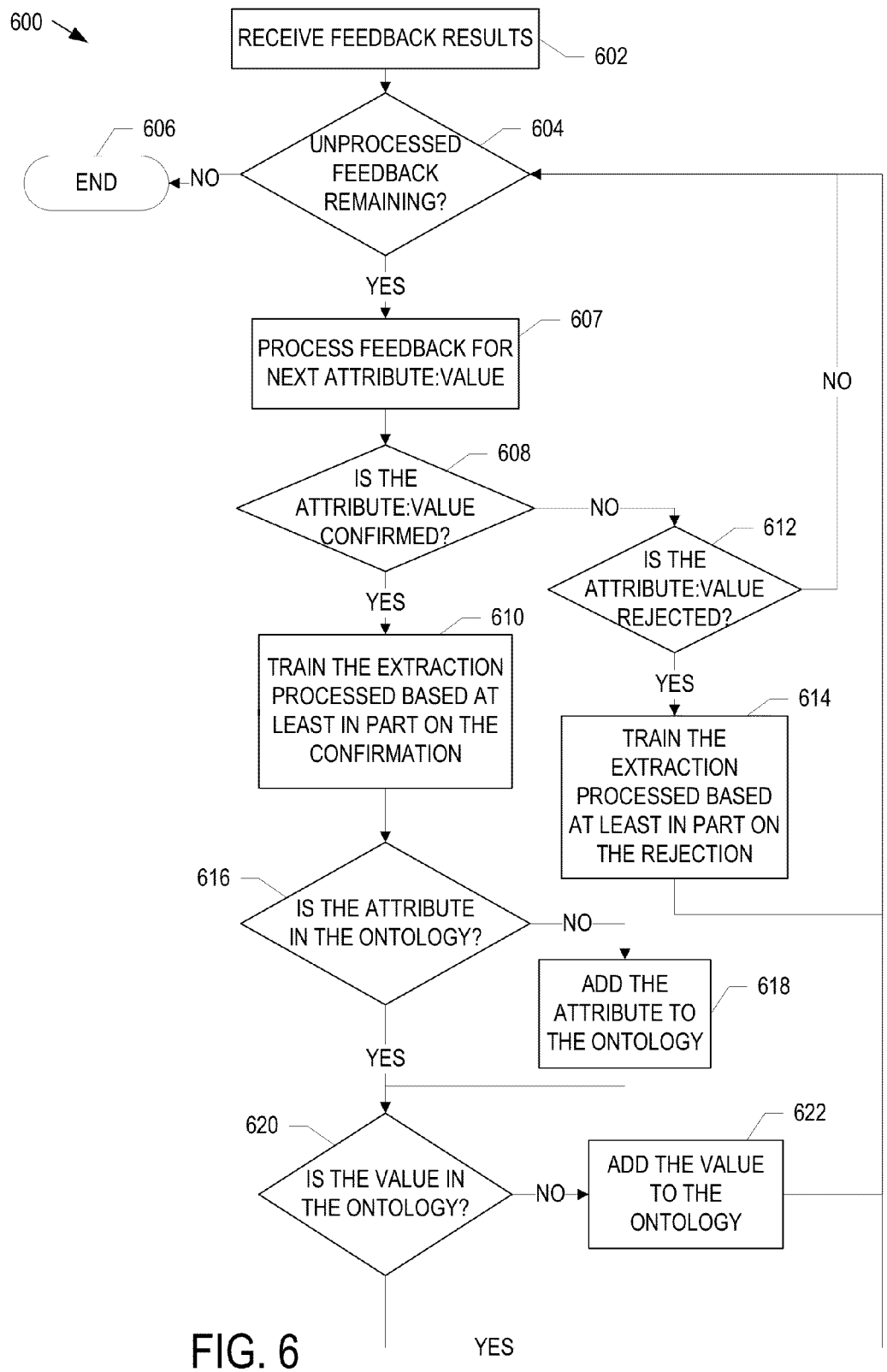
FIG. 6 is a flowchart of an example method for processing received feedback.

FIG. 6 is a flowchart of an example method 600 for processing received feedback. Feedback is received at the server 109 (602). If there is no unprocessed feedback remaining (604), the process ends (606). If there is unprocessed feedback remaining, the next attribute, its corresponding value, and the feedback response are processed (607). If the feedback confirms that the attribute-value pair accurately characterizes the data object (608), the extraction process is trained based at least in part on the confirmation (610). If the attribute-value pair is not confirmed the feedback is analyzed to determine if the attribute-value pair is rejected (612). If the attribute-value pair is rejected, the extraction process is trained based at least in part on the rejection (614). If the attribute-value pair was neither confirmed nor rejected, processing returns to block 604. Following the training of the extraction process where the attribute-value is confirmed (610), an association can be created between the data object and the confirmed attribute-value pair. For example, the attribute and value can be stored with the data object. The confirmed attribute-value pair can be analyzed to determine if the attribute is known to the ontology (616). If the attribute is not known in the ontology it can be added to the ontology (618). The confirmed attribute value pair can be analyzed to determine if the value is known in the ontology (620). If the value is not known in the ontology it can be added to the ontology (622). Processing can return to 604 where feedback for the next attribute-value pair is processed, or if there is no more unprocessed feedback, the method ends (606).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter affecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method comprising:
receiving a document from a user device;
analyzing the document to extract a plurality of values having corresponding attributes associated with attribute-value pairs in one or more domain models, wherein the analysis is based at least in part on associating the document with the one or more domain models of a plurality of domain models generated through analysis of a plurality of documents from one or more corpora and using an ontology associated with the one or more domain models to determine one or more attributes from the document, wherein the ontology includes terms relevant to particular domains corresponding to the one or more domain models, and wherein the attributes from the document are associated with particular terms of the ontology;
associating the determined one or more attributes with the document; and
using the associated attributes to generate search results responsive to a received search query.

2. The method of claim 1, wherein the analysis is used to extract one or more values from the document as corresponding to ontology terms and one or more candidate ontology terms associated with respective attributes.

3. The method of claim 2, comprising providing a user interface to a client, the user interface configured to present at least one question as to whether an extracted value of the one or more values paired with its corresponding attribute accurately characterizes the document, wherein at least one extracted value paired with its corresponding attribute is a candidate ontology term not found in the ontology and is presented in the at least one question.

4. The method of claim 3, comprising receiving a response to the at least one question from the client though the user interface indicating that the attribute-value pair accurately characterizes the data object.

5. A system comprising:
one or more computers including one or more storage devices and one or more processor devices configured to perform operations comprising:
receiving a document from a user device;
analyzing the document to extract a plurality of values having corresponding attributes associated with attribute-value pairs in one or more domain models, wherein the analysis is based at least in part on associating the document with the one or more domain models generated through analysis of a plurality of documents from one or more corpora and using an ontology associated with the one or more domain models to determine one or more attributes from the document, wherein the ontology includes terms relevant to particular domains corresponding to the one or more domain models, and wherein the attributes from the document are associated with particular terms of the ontology;
associating the determined one or more attributes with the document; and
using the associated attributes to generate search results responsive to a received search query.

6. The system of claim 5, wherein the analysis is used to extract one or more values from the document as corresponding to ontology terms and one or more candidate ontology terms associated with respective attributes.

7. The system of claim 6, comprising providing a user interface to a client, the user interface configured to present at least one question as to whether an extracted value of the one or more values paired with its corresponding attribute accurately characterizes the document, wherein at least one extracted value paired with its corresponding attribute is a candidate ontology term not found in the ontology and is presented in the at least one question.

8. The system of claim 7, comprising receiving a response to the at least one question from the client though the user interface indicating that the attribute-value pair accurately characterizes the data object.

9. A method comprising:
analyzing a document using one or more trained classifiers to extract a plurality of text values from the document and determine corresponding attributes for the text values based at least in part on an ontology containing a plurality of ontology terms relevant to a particular area of interest and that are associated with particular attributes, wherein each of the corresponding attributes is associated with a respective confidence value determined by one of the trained classifiers, wherein the confidence value represents a level of confidence in assigning the respective attribute to the document;
in response to a particular text value that is associated with a confidence value that does not satisfy a threshold but is greater than a minimum confidence value, presenting the corresponding attribute as a question to a client user;
assigning each of one or more of the plurality of text values to a corresponding attribute for the text value that is associated with a respective confidence value that satisfies the threshold;
associating the attributes with the document; and
using the associated attributes to generate search results responsive to a received search query.

10. The method of claim 9, comprising:
providing a user interface to a client, the user interface configured to present at least one question as to whether an extracted text value of the plurality of text values paired with its assigned attribute accurately characterizes the document.

11. The method of claim 10, wherein at least one extracted text value is a candidate ontology term not found in the ontology and is presented in the at least one question.

12. The method of claim 9, comprising analyzing a plurality of objects from a corpora to generate one or more domain models, and wherein analyzing the document comprises associating the data object with the domain models.

13. A system comprising:
one or more computers including one or more storage devices and one or more processor devices configured to perform operations comprising:
analyzing a document using one or more trained classifiers to extract a plurality of text values from the document and determine corresponding attributes for the text values based at least in part on an ontology, wherein each of the corresponding attributes is associated with a respective confidence value determined by one of the trained classifiers;
in response to a particular text value that is associated with a confidence value that does not satisfy a threshold but is greater than a minimum confidence value, presenting the corresponding attribute as a question to a client user;
assigning each of one or more of the plurality of text values to a corresponding attribute for the text value that is associated with a respective confidence value that satisfies the threshold;
associating the attributes with the document; and
using the associated attributes to generate search results responsive to a received search query.

14. The system of claim 13, comprising:
providing a user interface to a client, the user interface configured to present at least one question as to whether an extracted text value of the plurality of text values paired with its assigned attribute accurately characterizes the document.

15. The system of claim 13, wherein at least one extracted text value is a candidate ontology term not found in the ontology and is presented in the at least one question.

16. The system of claim 13, comprising analyzing a plurality of objects from a corpora to generate one or more domain models, and wherein analyzing the document comprises associating the data object with the domain models.

* * * * *